Oct. 6, 1942.  E. R. ALLING  2,297,680

CONTROL OF ELECTRICAL DEVICES FROM LIQUID LEVELS

Filed March 25, 1939  2 Sheets-Sheet 1

INVENTOR.
E. Roy Alling
By Parker, Brockway & Farmer
ATTORNEYS.

Oct. 6, 1942.                E. R. ALLING                2,297,680
CONTROL OF ELECTRICAL DEVICES FROM LIQUID LEVELS
              Filed March 25, 1939         2 Sheets-Sheet 2

INVENTOR
E. Roy Alling
By Parker, Rockwood & Farmer
ATTORNEYS.

Patented Oct. 6, 1942

2,297,680

UNITED STATES PATENT OFFICE 2,297,680

CONTROL OF ELECTRICAL DEVICES FROM LIQUID LEVELS

E. Roy Alling, Kenmore, N. Y.

Application March 25, 1939, Serial No. 264,174

6 Claims. (Cl. 200—152)

This invention relates to apparatus associated with tanks in which liquids are temporarily stored, such as in the dump or mixing tanks employed in the milk industry. At milk receiving plants where batches of milk are received from different producers, it is usually desirable to mix the receipts of milk from different producers in order to obtain a body of milk which has a minimum variation in butter fat content. The milk from different producers varies considerably in butter fat content, some of such milk, for example, being from Holstein cows, and that from other producers being from Jersey or Guernsey cows which give milk having a higher butter fat content. It is not always practical to mix all of the receipts of a day in one large tank in order to obtain uniformity in the total product, but sufficient uniformity may be obtained merely by mixing the receipts from a number of different producers.

The receipts from a number of different producers, after weighing and sampling, are introduced in batches into a common dump tank, in which there is always a substantial body of milk remaining until all of the receipts are in, and quantities of milk are removed from time to time to prevent the tank from overflowing. The level of liquid in the dump and mixing tank should not fall below a specified minimum, otherwise the pump may pump air, and also because there would be insufficient mixing of the different batches. This invention relates to means for aiding the attendants in maintaining the liquid level in the tank within certain limits, and may include manual or automatic control of the milk removing pump, or merely an indication of the liquid levels to aid the attendant in the control of the pump.

One object of the invention is to provide improved means for aiding in the maintenance of the levels of liquid within desired maximum and minimum limits, which will provide maximum assistance to the attendants in maintaining such levels between the desired limits; which will be entirely safe to the operator; which may utilize commercial current for its operation; with which the parts in contact with the milk or other liquid may be easily disassembled for cleaning at the end of each day's operations and reassembled; with which the apparatus and devices controlled by or through the variations in liquid level will be protected from momentary fluctuations in the level, such as may be caused by splashing or waves that occur as different batches are added to the tank suddenly, but which will be responsive to any actual changes in the levels over a material interval of time; and which will be relatively simple, compact, practical, sanitary and inexpensive.

Another object of the invention is to provide improved means for automatically controlling the operations of a pump that removes liquid from the dumping and mixing tank; with which suitable signals may be used to acquaint the operator with the sufficiency of operation of the pump, and to indicate if the liquid level does not remain between the desired limits.

Another object of the invention is to provide an improved signalling device which will indicate to an operator the liquid levels in the tank within specified ranges; which will be automatic in operation; and with which the signals will operate only when the liquid levels in the tank are outside of specified or desired limits of levels, so that the operator's attention will not become too accustomed to the signals during normal operations and thus fail to note their absence under the abnormal conditions.

Another object of the invention is to provide improved means for controlling electrical devices from liquid levels, in which the devices will not be momentarily operated due to momentary fluctuations of level in the tank, such as by waves or splashing, and which will be relatively simple, safe and inexpensive.

Another object of the invention is to provide an improved method of controlling the operations of electrical circuits from liquid levels without the uncertainty of floats, and by which the circuits will not be operated momentarily due to momentary fluctuations in the liquid levels in the tank.

Other objects and advantages will be apparent from the following description of several embodiments of the invention, and the novel features will be particularly pointed out hereinafter in connection with the appended claims.

Figure 1:
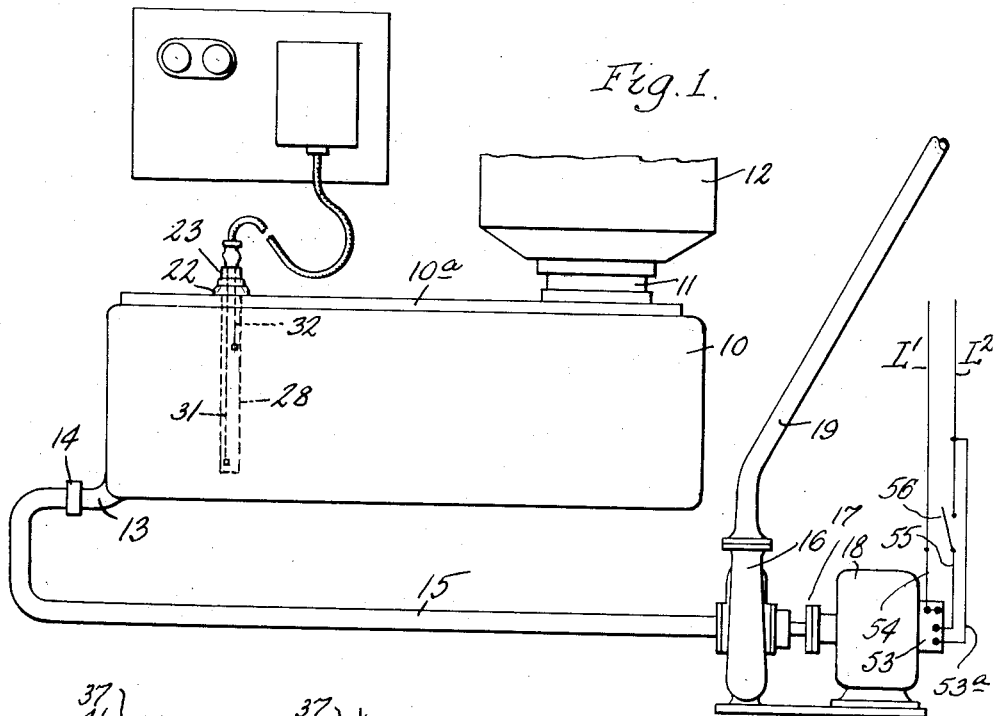
Fig. 1 is an elevation of a dump or mixing tank, with means for adding and removing liquid therefrom at intervals and in batches, and into which is incorporated an improved signalling device and automatic control of the pump in accordance with this invention.

Referring first to the embodiment of the invention shown in Figs. 1 to 6, the dump or mixing tank 10 may be of any desired shape or size, and when employed in the milk industry at receiving plants, it receives charges or batches of milk at intervals from a pipe 11 leading to a weighing device 12. The tank 10 is provided at its lower part with an outlet pipe 13 which is connected through a coupling 14 to a pipe 15 leading to the suction side of a suitable pump 16, which pump is shown as of the centrifugal type, but which may be of any suitable type that is operated when desired through a coupling 17 from a motor 18. The outlet side of the pump is connected to a pipe 19 which delivers the milk or other liquid to any desired part or apparatus of the plant, such as to a pasteurizing device, a storage tank or a bottling device. The motor 18 is illustrated as an electric motor of the alternating current type, and it may be controlled manually or automatically, or both, in accordance with different modifications of the invention which will be hereinafter described.

The cover 10a of the tank is provided with an opening 20 (Fig. 2) which is surrounded by an upstanding flange 21 over which fits a depending flange or skirt 22 of an insulating member or cap 23. This cap or member 23 may be formed of any suitable material, but preferably is formed from any of the molded insulating compositions which are available in the open market. The cap or member 23 is provided on its underface with a recess 24, and from opposite sides of the side walls of the recess 24, metallic pins 25, Figs. 4 and 5, project into the recess. These pins 25 are carried by a U-shaped metallic plate 26, which is preferably molded or encased within the material of the recess walls of the cap 23. A metallic post 27 extends from the plate 26 upwardly through the cap so as to provide a contact post on the outside of the cap or member 23, to which conductor wires may be connected for completing electric circuits in a manner which will appear presently. It will be noted that the post 27 is electrically connected through the plate 26 to the pins 25.

Figure 2:
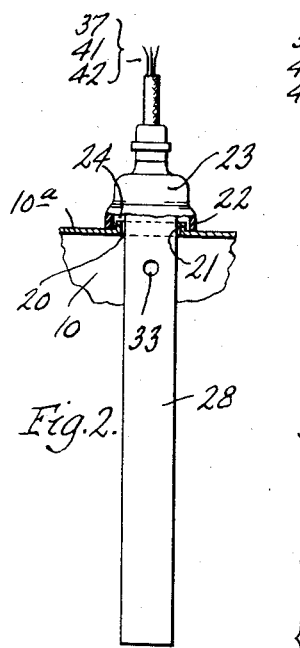
Fig. 2 is a sectional elevation through a portion of the tank, and illustrating the manner of controlling electrical circuits from the liquid levels in accordance with this invention.
Figure 3:
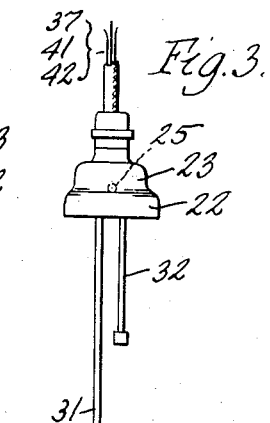
Fig. 3 is an elevation of the circuit-controlling devices of Fig. 2, with some of the parts separated.
Figure 4:
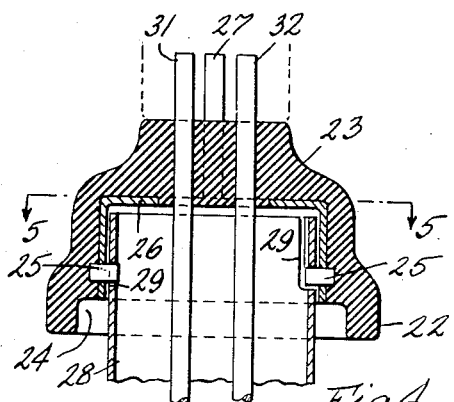
Fig. 4 is a sectional elevation through the insulating cap or member of Figs. 2 and 3, but with the tube attached to the insulating member.
Figure 5:
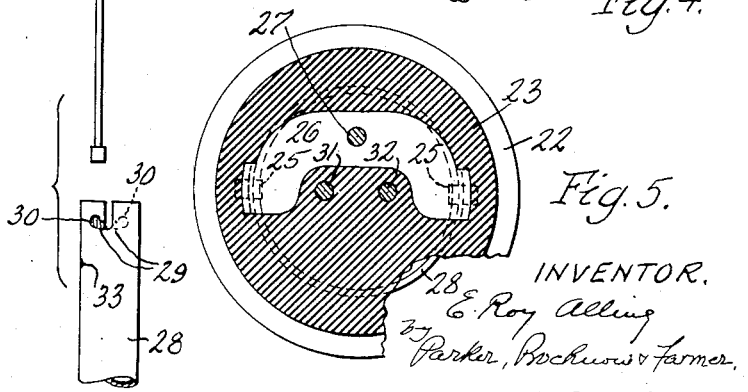
Fig. 5 is a sectional plan of the same cap or insulating member, the section being taken approximately along the line 5—5 of Fig. 4.

A metallic tube 28, open at both ends, is inserted into the recess on the underface of the cap or member 23, as shown in Figs. 2 and 4, and the upper end of the tube is provided with bayonet slots 29 which receive the pins 25, and then upon rotation of the tube 28, the pins 25 may be carried into laterally extending sections of the bayonet slots which prevent the removal of the tube 28 by mere endwise movement, and thus acts as a removable coupling between the tube 28 and the pins 25. Preferably, the branch or lateral zones of the bayonet slots have upwardly extending or retrogressive terminals or blind ends 30 (Fig. 3) into which the pins 25 engage, so that once the pins 25 are engaged in the upstanding blind ends 30 of these bayonet slots, the tube will be supported by its own weight from the cap 23 and will not be disengaged merely by rotation of the same in the cap or member 23. To disengage the tube it must first be raised slightly, then turned to carry the pins into the longitudinally extending entrance ends of the bayonet slots, after which the downward movement of the tube will disengage it from the pins 25. This reduces the danger of accidental or unintentional disengagement of the tube 28 from the insulating member 23 which is an important safety consideration in view of the fact that the tube is utilized as part of the controls for the signals and the pump in a manner which will be explained.

Since the tube 28 is supported entirely from the pins 25 it will be electrically connected through those pins and the plate 26 to the contact post 27. Exposed electrical conductors 31 and 32 extend downwardly from the cap or member 23 of insulating material in spaced relation to one another and in spaced relation to the contact 27 and the plate 26. The conductors 31 and 32 depend to different levels and are enclosed by the tube 28 but in insulated relation thereto. The upper ends of the conductors 31 and 32 extend upwardly beyond the cap or member 23 so as to form contacts for connection to the controlling circuits which will shortly be explained. The insulating cap or member 23, tube 28 and the conductors 31 and 32 form a low voltage unit which may be inserted into the tank through the opening 20 in the cover 10a thereof, as shown clearly in Figs. 1 and 2, or it may be easily removed and disassembled for cleaning at the end of each day's operation. The tube 28, being easily removable, provides easy access to the conductors 31 and 32 for cleaning and to enable cleaning and sterilizing of the inside of the tube 28. These parts which are wet by the milk or other contents of the tank must be cleaned and sterilized at least at the end of each day's operation and it is highly important that all parts which engage the milk or liquid be easily available for cleansing.

Inasmuch as the tube 28 usually fits fairly closely or snugly in the cap 23 some further vent is desirable to allow the escape of air from the tube with sufficient rapidity in order that liquid may rise within the tube 28 into contact with the conductors 31 and 32. For this purpose the tube 28 is provided adjacent one end, which in this instance is conveniently the upper end, with a vent or restricted opening 33, disposed just below the cap 23. The vent 33 allows the liquid level to rise in the tube 28 with reasonable speed, yet momentary fluctuations in the liquid level in the tank on the outside of the tube 28, such as may be caused by the waves or splashing of the liquid upon the dumping of additional charges or batches into the tank, will have little influence on the liquid level in the tube 28. This avoids momentary making and breaking of the circuits in which the conductors 31 and 32 are connected, with unnecessary flashings and warnings of signals, or momentary startings and stoppings of the pump. The size of the opening 33 may be varied or selected as may be desired, but should be sufficiently restricted to reduce to a minimum the momentary fluctuations of liquid level in the tube 28 in response to corresponding momentary fluctuations in the liquid of the tank 10.

Figure 6:
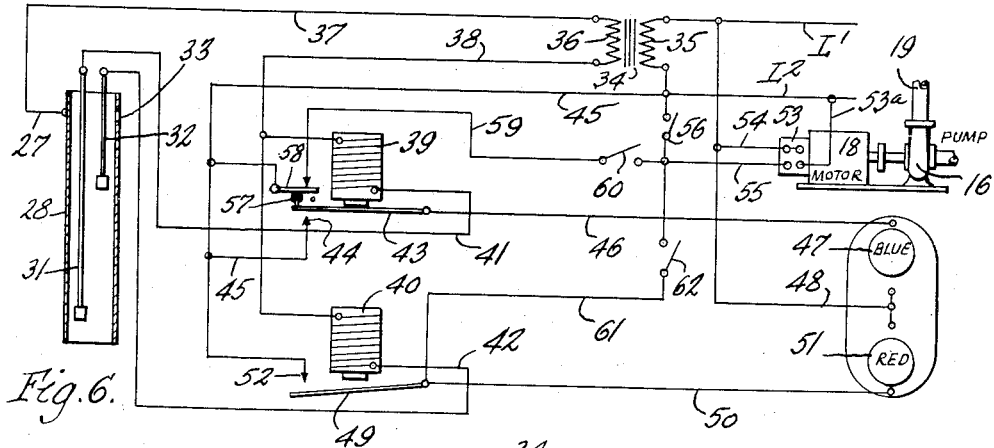
Fig. 6 is a schematic diagram of the circuits and mechanism for signalling abnormal fluctuations in the liquid level in the tank, and optionally for starting the pump automatically to remove part of the liquid from the tank whenever the liquid level reaches a desired maximum level in the tank.

Referring now particularly to Fig. 6, the electrical circuits controlled by the conductors 31 and 32 and the tube 38 and which form one embodiment of the invention will now be described. The transformer 34 has its high voltage primary winding 35 connected to line wires $L^1$ and $L^2$ which constitute a suitable source of alternating current of commercial voltage, such as 110 to 120 volts A. C. or 220 volts A. C. One side of the low voltage winding 36 of the transformer 34 is connected by a wire 37 to the post 27 which is in electrical communication with the tube 28. The other side of the low voltage secondary winding 36 is connected by a wire 38 to one side of a low voltage relay 39 and to one side of another low voltage relay 40. The other side of the relay 39 is connected by a wire 41 to the conductor 31. The other side of the relay 40 is connected by a wire 42 to the exposed conductor 32. Thus when the liquid rises in the tube 28 until it reaches the conductor 31 it completes a circuit between the tube 28 and the conductor 31 from the low voltage winding of the transformer and through the low voltage relay 39.

The armature 43 of the relay 39, when the relay is deenergized, engages with a switch contact 44 which is connected by a wire 45 to the line wire $L^2$. The armature 43 is also connected by a wire 46 to one terminal of a signal device 47, such as an incandescent lamp or an audible signal device, but preferably the lamp. The other terminal of that lamp or signal device 47 is connected by a common wire 48 to line wire $L^1$. Thus when the relay 39 is deenergized, a circuit is established from line wire $L^2$ through wire 45, contact 44, armature 43, wire 46, signal device 47 and wire 48 to line wire $L^1$, thus completing a circuit through the signal device 47. This signal device in this particular example may be an incandescent lamp of blue or any other distinctive color or designation. Thus when the liquid level in the tube 28, which corresponds to the liquid level in the tank 10, is below the lowermost end of the conductor 31, the signal device 47 is operated to indicate that the liquid level is below the desired minimum level. When the liquid level rises to the conductor 31 it completes a circuit through and energizes the low voltage relay 39, and as armature 43 is attracted, the circuit through the signal device 47 is opened.

The relay 40 is provided with an armature 49 which is connected by a wire 50 to one side of another signal device 51 which also may be an incandescent lamp and distinguished by any suitable color or designation, such as a red color. The other side of the signal device 51 is connected to the common wire 48 which leads to the line wire $L^1$. When the armature 49 is attracted it engages the contact 52 which is connected also to the wire 45 that runs to the line wire $L^2$. Thus, when the relay 40 is energized it attracts its armature 49 and completes a circuit from the line wire $L^2$ through wire 45, contact 52, armature 49, wire 50, signal device or lamp 51, common wire 48, to line wire $L^1$. This causes an operation of the lamp or signal device 51.

Since the relay 40 is energized whenever the liquid level in the tube 28 rises until it engages the conductor 32 or higher, it follows that this lamp or signal device 51 will be operated whenever the liquid level in the tank 10 reaches or passes its upper maximum or desired level, and as soon as the liquid level falls below the conductor 32, the relay 40 will be deenergized and the signal device 51 will be rendered ineffective. Thus so long as the liquid level in the tank 10 is between the desired maximum and minimum levels which are determined by the upper and lower levels of the conductors 31 and 32, neither signal device 47 or 51 will be effective. If the liquid falls below the minimum level, the signal device 47 is at once operated to call the attention of the operator or attendant to this abnormal condition, and similarly if the tank level rises beyond the maximum desired level then the attendant's attention is also called to this abnormal condition by the actuation of the danger signal 51.

It will be noted that the circuit connections which lead to the conductors 31 and 32 and to the tube 28 all carry very low voltage such as from 10 to 25 volts, for example, which makes them entirely safe to handle without special precautions or danger of injury from electric shock. Thus the attendant may insert the unit of the insulating cap 23, tube 28 and conductors 31 and 32 into the tank or remove them, or make any other adjustments or changes with perfect safety even though the current may be on. The signal devices, however, are operated from the standard commercial circuit through the relays which are disposed at a distance from the parts that are inserted into and removed from the tanks, and which relays and signal devices need not be ordinarily handled by the operator or attendant.

The motor 18 which operates the pump 16 may be controlled by a suitable motor starter 53, such as of the magnetic type, one side of which is connected by the wire 54 to the wire 48 leading to the line wire $L^1$. The other controlling wire 55 from the starter 53 is connected through a switch 56 to the line wire $L^2$. The current for the motor may be supplied through the wires 54 and 48, and through a third wire 53a from the starter direct to line wire $L^2$. The switch 56 may be of the manually operated type, so that the attendant may operate or stop the motor and pump merely by closing or opening the switch 56. Provision also may be made for automatically starting the pump as soon as the liquid level reaches the conductor 31. For that purpose the armature 43 is provided with an insulating roller 57 which, upon attraction of the armature, closes a switch 58 connecting the wire 45 to a wire 59 which is connected through a manually operated switch 60 to the wire 55. Thus if the attendant wishes to have the pump started automatically whenever the liquid level reaches or passes above the lowermost end of conductor 31, he merely closes the switch 60, and then when the low voltage relay 39 is energized by the closing of the low voltage circuit through the conductor 31, the armature 43 which opens the circuit through the signal device 47 will close the switch 58 and complete a shunt circuit which energizes the magnetic starter 53 and starts the motor and pump. The pump will be stopped automatically when the level is lowered by the pump below the lower end of conductor 31.

The attendant may incapacitate this automatic control merely by opening the switch 60, without interfering with the manual control through the switch 56. A further safety control of the pump may also be provided by connecting the armature 49 by wire 61 to the wire 55 at a point between the switch 56 and the starter 53. The wire 61 also has a manually operated switch 62 therein, by which this additional control may be made selectively effective or ineffective. When the switch 62 is closed, the energizing of the low voltage relay 40 by the contact of the liquid in the tank with the shorter conductor 32 will not only operate the danger signal 51 but will establish a branch circuit through wire 61 and wire 55 to the magnetic starter 53 which starts the pump automatically to withdraw liquid from the tank and prevent its overflowing.

Thus the attendant may, by these additional controls, cause the pump to be operated automatically in an effort to keep the level below the normal level determined by the lower end of the conductor 31, or he may manually start and stop the pump to maintain the liquid level in the tank between the desired limits. He may also close the switch 62 and insure an automatic starting of the pump if he should neglect to start the pump before the upper limit of liquid level is reached.

Figure 7:
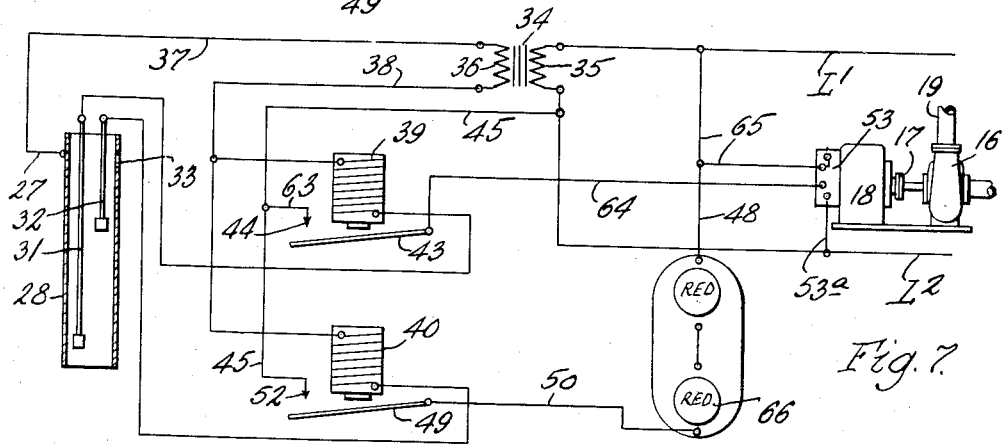
Fig. 7 is a similar diagram illustrating a modification thereof.

Referring now to Fig. 7, another embodiment of the invention is illustrated. The line wires L¹ and L² supply an alternating current of commercial voltage to the transformer 34 the same as in Fig. 6, and parts in Fig. 7 which have corresponding parts in Fig. 6 are designated by the same reference characters as in Fig. 6. The description of Fig. 7 will thus be limited to the points of difference. In Fig. 7, instead of having the armature 43 open the circuit to the signal device 47 when the relay 39 is energized, it closes a circuit through a wire 63 from the wire 45 to a wire 64 leading to the magnetic starter 53 for the motor 18. The other wire 65 from the starter 53 is connected to the line wire L¹. Thus the energization of the relay 39 will automatically close a circuit to the starter 53 to start the motor and pump in operation and will automatically stop the motor whenever the relay 39 is deenergized. The relay 40, through its armature 49, when energized closes a circuit from wire 45 through wire 50 to one terminal of a signal device 66 which may be similar to signal 51, the other terminal of the signal device being connected by the wire 48 to the wire 65 and line wire L¹.

Where the commercial voltage employed is 220 volts, the signal device 66 as shown in Fig. 7, may comprise two incandescent lamps of 110 volts each, connected in series to one another, so that standard voltage lamps may be employed. Otherwise, the connections and parts are the same as in Fig. 6. According to this embodiment of the invention, whenever the liquid level in the tank reaches the lower conductor 31 in the tube 28, the motor and pump are automatically started and will continue in operation until the liquid level is dropped to a point below the lower end of the conductor 31, but if the liquid level continues to rise because the liquid is being admitted to the tank faster than it is withdrawn, then as soon as the rising level of liquid reaches the upper conductor 32 a circuit will be established through the danger signal device 66. An automatic flashing device may be included in the socket of one of the signal devices 66 so as to flash them, if desired, as a more effective warning that the pump is unable to maintain the level in the tank 10 below the safe maximum level. Similar flashers may also, if desired, be included in the sockets of lamps 47 and 51, for similar purposes.

Figure 8:
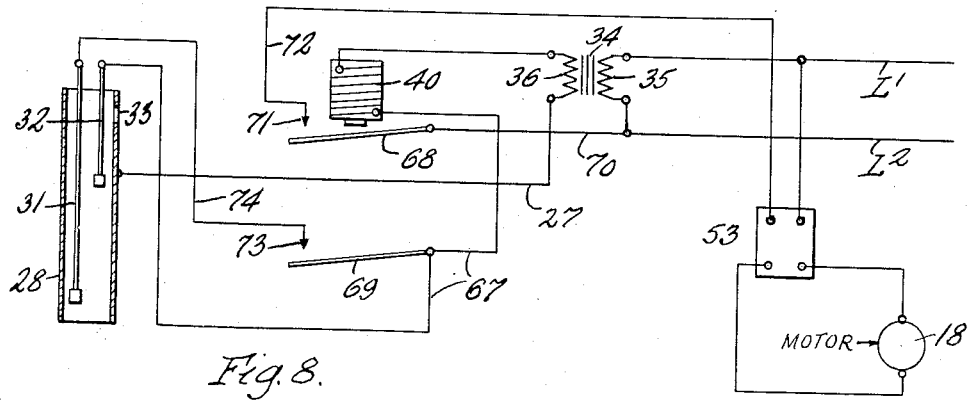
Fig. 8 is another schematic diagram of a still further modification of the invention.

In the embodiment of the invention illustrated in Fig. 8, parts corresponding to similar parts in Figs. 6 and 7 are designated by the same reference characters, and the modifications by new reference characters. The low voltage relay 40 is connected to one terminal of the low voltage winding 36 of the transformer 34 and by wire 67 to the shorter conductor 32. The relay 40 is here provided with two armatures 68 and 69, both of which are attracted when the relay 40 is energized. The armature 68 is connected to the line wire L¹ by a wire 70 and, when attracted by the relay 40, engages a contact 71 to close a circuit to the wire 72 leading to the magnetic starter 53 for the pump motor. The armature 69 is connected to the wire 67 and when attracted engages contact 73 which is connected by a wire 74 to the longer conductor 31.

The tube 28 is connected by a wire 27 to the other side of the low voltage secondary winding 36 of the transformer. The magnetic starter 53 is connected to the motor for starting and stopping the motor in the same manner as in Figs. 6 and 7. According to this form of the invention, whenever the liquid level reaches the lower conductor 31 it does not complete a circuit to the magnetic starter 53 because the relay 40 is deenergized and the circuit to that conductor 31 is opened by the armature 69. When the liquid level in the tank reaches the upper conductor 32 it completes a circuit through the conductor 32, wire 67, relay 40, transformer winding 36 and wire 27 to tube 28. The relay 40 then closes the circuit to the magnetic starter 53 to start the motor and the pump and also closes the circuit through the armature 69 to the lower conductor 31. The motor will then continue to operate until the liquid level drops below the lowermost conductor 31, because after the liquid level drops below the conductor 32 the circuit of relay 40 will still be established through the lower conductor 31, wire 74, armature 69, wire 67 and the relay 40 to keep it energized and the pump operating until the circuit through the lower conductor 31 is broken.

The operation of the apparatus has been described as the description of the various parts and circuits proceeded. It will be obvious that momentary closings and openings of the circuit to the starter for the pump because of the splashing and waves of the liquid in the tank, as liquid is added from time to time, will be substantially avoided by the enclosure of the conductors 31 and 32 within the tube 28 having the restricted vent 33 therein. At the same time the conductors which engage the liquids such as the milk, may all be readily reached for cleaning and may be removed from the tank in a simple manner for that purpose. The parts handled by the attendant for such cleaning are all included in the low voltage part of the circuit, which makes it safe for the attendant to handle the same, and at the same time there is less electrolysis of the liquid of the tank due to the passage of current therethrough. The low voltage portion of the current is utilized to control the commercial voltage current for the operation of the pump. This makes an extremely compact, simple and yet practical and efficient apparatus. The different forms of the invention provide the attendant with optional controls for either automatically starting the pump, or by giving signals whenever the liquid level in the tank happens to deviate from selected maximum and minimum levels, so that the attendant can either slow up the addition of liquid to the tank or start the pump operating to maintain the liquid level in the tank within desired limits.

The conductors 31 and 32 and tube 28 may be disposed in an electrically conducting liquid whose level is directly responsive to the liquid level in tank 10, but ordinarily, as shown, they are most easily disposed directly into the tank for direct contact with the liquid in that tank.

It will be understood that various changes in the details and arrangements of parts, which have been herein described and illustrated in order to explain the nature of the invention, may be made by those skilled in the art within the principle and scope of the invention, as expressed in the appended claims.

I claim as my invention:

1. In apparatus in which electrically actuated devices are rendered effective and ineffective by fluctuations of liquid level in a tank containing milk, and in which liquid is added to that already in the tank at intervals in a manner to create waves in the liquid body in said tank that improvement which comprises said tank, a supporting member of electrically insulating material, exposed electrical conductors supported by said member in insulated relation to one another and depending side by side therefrom to different levels, a metallic tube surrounding said conductors and detachably supported by and depending from said member to a point below the lowermost conductor and open adjacent opposite ends, whereby when the member, conductors and tube are disposed upright in a tank, the liquid in the tank may rise in said tube to the same level as in said tank, and electrical circuit terminals connected to said conductors and tube.

2. In apparatus responsive to the varying levels of liquids such as milk in a tank, that improvement which comprises said tank, a member of insulating material removably mounted on the tank and having a recess in its underface, pins on the side walls of the recess and projecting into the recess, a metallic tube having bayonet slots engageable with said pins when said tube is inserted into the recess with the pins in alinement with the entrance ends of the slots, and in the offsets of which slots the pins may engage when the tube is rotated about its longitudinal axis after the pins enter the slots, a conductor connecting said pins and having a contact post extending from said member to the outer face thereof, conductors also supported by said member in insulated, spaced relation to one another and depending from the member side by side within said recess and within said tube to different levels within the tube, and also outwardly from said member for connections to electrical circuits to be controlled, said tube forming one depending conductor and all of the depending conductors extending into the tank sufficiently for contact with the liquid in the tank.

3. In apparatus responsive to the varying levels of a liquid such as milk in a tank, that improvement which comprises said tank, a member of insulating material removably mounted on the tank, a metallic tube detachably connected to said member to depend therefrom, a conductor detachably connected to said tube and having a contact post extending from said member to the outer face thereof, conductors also supported by said member in insulated, spaced side by side relation to one another and depending side by side from the member within said tube to different levels within the tube substantially below said insulating member, and also outwardly from said member for connections to electrical circuits to be controlled, said tube forming one depending conductor and said tube and all of the depending conductors extending into the tank sufficiently for contact with the liquid in the tank, said tube being open at vertically spaced points therealong so as to permit the rise of liquid in the tube.

4. In an apparatus for a tank of the type in which milk or other liquids are mixed and the liquid added in increments in a manner to create waves and splash in the liquid in said tank when a new batch of liquid is suddenly added, and in which an electrical device is controlled by the liquid level in said tank, that improvement in a level responsive switch for controlling the circuit of said device, which comprises said tank having an aperture in its top, a support of insulating material formed for attachment to the top of the tank and bridging said aperture therein, said support having a recess in its under face in the portion bridging said aperture, a metallic rod extending through said support at said aperture and depending below said aperture to a substantial extent into said tank and be wet by the liquid in said tank when the level thereof is sufficiently high, a metallic pin on the side wall of said recess, a conductor extending from said pin to an outside face of said support for attachment to an external conductor, a metallic tube telescopingly received within said recess and having a detachable engagement with said pin so as to be supported thereby and to have electrical contact therewith, said tube having an opening adjacent its top and another adjacent its bottom and surrounding said rod to enable liquid from the tank to rise and fall therein upon corresponding fluctuations in the liquid level in said tank, one of said openings being of such restricted size that it retards equalization of the level of liquid in said tube with the liquid level outside of the tube in said tank sufficiently to materially reduce momentary fluctuations of the level of the liquid in said tube.

5. In an apparatus for a tank of the type in which milk or other liquids are mixed and the liquid added in increments in a manner to create waves and splash in the liquid in said tank when a new batch of liquid is suddenly added, and in which an electrical device is controlled by the liquid level in said tank, that improvement in a level responsive switch for controlling the circuit of said device, which comprises said tank having an aperture in its top, a support of insulating material formed to rest upon the top of a tank and bridge said aperture, a metallic rod carried by and extending through said support and depending through said aperture substantially below the under face thereof within the tank, said rod being formed at its outer end for attachment to an electrical conductor and being exposed for its entire length below said support, an exposed conducting member also carried by said support and depending through said aperture into the tank and disposed alongside and spaced and insulated from said rod, said member having a connection leading through said support to an outer face thereof, and means for restricting momentary fluctuations of liquid level between said conductor and rod upon momentary fluctuations in liquid level in said tank.

6. In an apparatus for a tank of the type in which milk or other liquids are mixed and the liquid added in increments in a manner to create waves and splash in the liquid in said tank when a new batch of liquid is suddenly added, and in which an electrical device is controlled by the liquid level in said tank, that improvement in a level responsive switch for controlling the circuit of said device, which comprises said tank having an aperture in a cover therefor, a support of a size to bridge said aperture, resting upon said cover and having a flange at its lower face engageable with said tank adjacent said aperture and limiting movement of said support crosswise of said aperture, said support having a recess in its under face within the zone enclosed by said flange and of lesser diameter than said aperture, a tube received within said recess and detachably carried by said support and depending from said support through said aperture substantially below said cover, a rod extending through said support and downwardly through said recess to a substantial extent below said support and within said tube, said rod being electrically insulated from said tube, and said tube extending at least approximately as far as the lower end of said rod and having openings adjacent its top and bottom to enable liquid from the tank to rise and fall within the tube upon corresponding fluctuations in the liquid level in said tank, one of said openings in said tube having a portion thereof of such restricted size that it retards equalization of the liquid level within said tube with that outside of said tube sufficiently to materially reduce momentary fluctuations of level in the tank outside of said tube.

E. ROY ALLING.